Aug. 16, 1966     S. A. PAOLI     3,266,543
METHOD OF PRODUCING BONELESS COMMINUTED MEAT
Filed Aug. 17, 1965     8 Sheets-Sheet 1

Aug. 16, 1966  S. A. PAOLI  3,266,543
METHOD OF PRODUCING BONELESS COMMINUTED MEAT
Filed Aug. 17, 1965  8 Sheets-Sheet 2

INVENTOR.
STEPHEN A. PAOLI
BY
Wolfe, Hubbard, Voit & Osann,
ATTYS.

Aug. 16, 1966  S. A. PAOLI  3,266,543
METHOD OF PRODUCING BONELESS COMMINUTED MEAT
Filed Aug. 17, 1965  8 Sheets-Sheet 3

INVENTOR.
STEPHEN A. PAOLI
BY
Wolfe, Hubbard, Voit & Osann,
ATTYS.

Aug. 16, 1966 S. A. PAOLI 3,266,543
METHOD OF PRODUCING BONELESS COMMINUTED MEAT
Filed Aug. 17, 1965 8 Sheets-Sheet 5

INVENTOR.
STEPHEN A. PAOLI
BY Wolfe, Hubbard, Voit & Osann
ATTYS.

Aug. 16, 1966  S. A. PAOLI  3,266,543
METHOD OF PRODUCING BONELESS COMMINUTED MEAT
Filed Aug. 17, 1965  8 Sheets-Sheet 7

INVENTOR
STEPHEN A. PAOLI
by: Wolfe, Hubbard, Voit & Osann
ATTYS.

INVENTOR
STEPHEN A. PAOLI
by: Wolfe, Hubbard, Voit & Osann
ATTYS.

United States Patent Office 3,266,543
Patented August 16, 1966

3,266,543
METHOD OF PRODUCING BONELESS
COMMINUTED MEAT
Stephen A. Paoli, 821 Westchester Drive, Rockford, Ill.
Filed Aug. 17, 1965, Ser. No. 480,463
12 Claims. (Cl. 146—222)

The present invention relates in general to food processing and, more specifically, to a method of producing high quality boneless comminuted meat from a dressed animal carcass, including a fowl, fish, or meat animal carcass, or portions thereof. This application is a continuation-in-part of my copending application Serial No. 393,966, filed September 2, 1964, as a continuation-in-part of my earlier filed applications Serial Nos. 27,-150, filed May 5, 1960, and 311,555, filed September 25, 1963, both now abandoned.

In modern food processing, huge quantities of comminuted raw meat from poultry, other livestock or fish are utilized in the manufacture of food products such as bologna, wieners, pot pies, spreads, soups, sauces, sticks, baby foods and countless others. The desirability of automating the production of such comminuted meat has long been recognized but little progress has been made in that direction heretofore because of the high manual labor factor required in removing the meat from the bones. This has resulted in increased costs to the consumers of processed foods.

The high manual labor factor referred to above has also caused food producers to downgrade certain meat, poultry or fish items where the cost of manually removing meat from bone is not economically justified. These downgraded items, as, for example, chicken and turkey necks and backs, manually cleaned beef and pork bones, or skeletal fish from which the fillets have been cut, are frequently ground up and used in relatively low priced products such as dog food even though they contain some high quality lean meat. Separation of such meat from the mixture of meat and fragments of bone, cartilage, gristle, sinew and the like discharged by the grinder has not been feasible heretofore. Food producers have thus been forced to accept a lower return on these downgraded items.

Another aspect of the problem of producing boneless comminuted meat is found in meat packing operations after the carcass has been divided into prime cuts and the usable meat cut away from the bones. The latter are subsequently scraped to recover as much of the remaining usable meat as possible. As an incident to such processing, the saws, cleavers, knives and other equipment used tend to produce fragments of bone, gristle, sinew or the like that become entrained in the meat. While such entrained fragments are harmless from the nutritional standpoint, they tend to detract from the value and salability of the meat product. Heretofore there has been no practical way to remove such fragments without introducing water, cooking the meat, or otherwise changing its character and flavor drastically.

The general aim of the present invention is to provide a method of producing high quality boneless comminuted meat from a dressed animal carcass, including a fowl, fish or meat animal carcass, or portions thereof, particularly well adapted for large volume continuous operation at relatively high production rates, thereby making possible fully automated production of comminuted meat from poultry, other livestock, or fish.

The term "boneless comminuted meat," as used herein, denotes comminuted meat with substantially no entrained bone, cartilage, gristle, sinew or the like readily perceptible to the touch when held between the fingers. The term "dressed animal carcass," as used herein, denotes a conventional dressed whole carcass of meat animals such as beef, pork or lamb; a conventional dressed whole carcass of poultry such as chicken or turkey; and a gutted but otherwise whole carcass of fish, including scales and fins. The term "portion," as applied herein to a "dressed animal carcass," denotes any part thereof such as a prime cut of beef or pork; a neck, wing, or back of chicken or turkey; or a headed and gutted fish from which the fillets have been removed.

A more specific object of the invention is to provide a method of the character set forth for producing boneless raw comminuted meat from a dressed animal carcass or portion thereof without damaging the meat in any way.

Another object is to provide a method of the foregoing type for producing boneless raw comminuted meat from a dressed animal carcass or portion thereof without introducing water or other additives.

Still another object of the invention is to provide a method of the foregoing character for producing boneless comminuted meat conforming to the high standards of sanitation normally required in meat processing operations.

Other objects and advantages will become apparent as the following description proceeds, taken together with the accompanying drawings, wherein.

While the invention is susceptible of various modifications and alternatives, certain illustrative embodiments and modes have been shown in the drawings and will be described below in considerable detail. If should be understood, however, that there is no intention to limit the invention to the specific forms disclosed, but on the contrary, the intention is to cover all modifications, alternatives, modes and equivalents falling within the spirit and scope of the invention as expressed in the appended claims.

Figure 1:
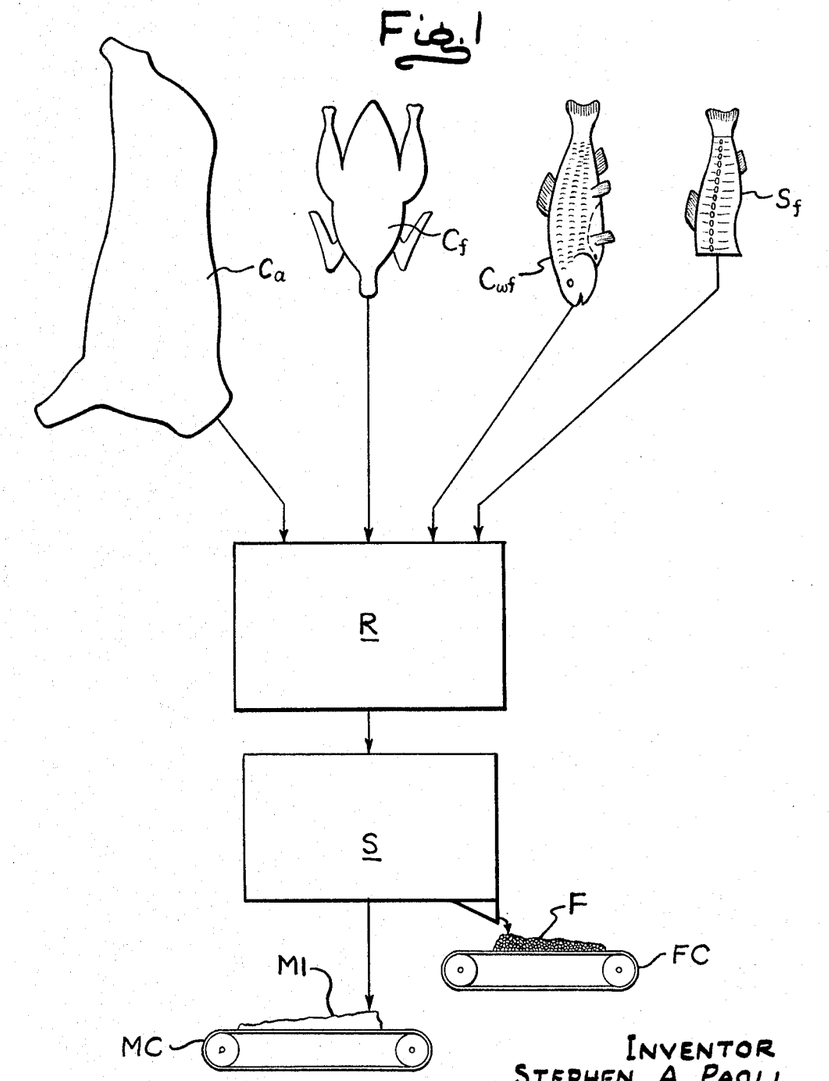
FIGURE 1 is a diagrammatic view illustrating the method of the present invention in its broader aspects.

Referring more specifically to FIGURE 1, the method of the invention is there exemplified diagrammatically in its broader aspects. As indicated earlier herein, the raw material comprises a dressed animal carcass or portion thereof. Among the alternative raw materials shown in FIGURE 1 is a dressed fowl carcass $C_f$, a dressed meat animal carcass $C_a$, a gutted whole fish carcass $C_{wf}$, and a fish skeletal $S_f$. All of these are preferably uncooked. In the practice of the method, the dressed animal carcass or portion thereof is reduced at stage R to a relatively coarse agglomeration of fragmented soft and hard tissues. In the case of a whole carcass, the greater proportion of the agglomeration will be meat, other edible soft tissues, and fat, collectively designated as M, while the remainder will be entrained fragments F of bone and hard tissue. In the case of a portion of a carcass, the proportion of meat to bone and hard tissue may be somewhat less. Following the reduction stage, the coarse agglomeration is subjected to a separating stage S. In this stage, the agglomeration is continuously separated into boneless comminuted meat $M_1$ and fragments F of bone and hard tissue. As an incident to such continuous separation, the boneless meat $M_1$ becomes further comminuted and the fragments F are removed, both the boneless meat and the fragments being collected separately and continuously. The boneless comminuted meat $M_1$, containing substantially no fragments readily perceptible to the touch, may then be packaged or processed in a number of ways to produce desired end products. The waste fragments F may be converted into one or more by-products.

The reduction stage R may be carried out with a variety of apparatus such, for example, as an auger type grinder. Satisfactory results have been obtained with such a unit when equipped with a coarse orifice plate having discharge openings on the order of 3/8" in diameter. The particular size of the discharge openings may, of course, be varied somewhat but should not be so small that the meat becomes emulsified or substantial amounts of bone become pulverized. If this should occur, the consistency and flavor of the meat may be objectionably altered. When the reduction stage is properly carried out, the resulting coarse agglomeration of fragmented soft and hard tissues includes meat, bone, cartilage and fat. In the case of fowl, it may also include both tendon and skin. In the case of meat animals, it may also include pieces of sinew. In the case of fish, it may also include skin, scales and fins. In each case, that portion of the agglomeration comprising meat, other edible soft tissues, and fat will be collectively referred to herein as "meat" and designated by the letter "M."

In order to carry out the separating stage S of the method of the invention, the coarse agglomeration of fragmented meat, bone and hard tissues M, F produced in the reduction stage is spread into a moving web of decreasing thickness. With the web in motion, provision is made for continuously distinguishing between the meat M and perceptible entrained fragments F of bone or other hard tissues. In the course of such action, the distinguishing means passes the meat through, but arrests the perceptible entrained fragments F. As an incident to such action, the meat becomes further comminuted and boneless. The boneless comminuted meat, now designated $M_1$, is continuously guided toward a meat discharge zone where it is collected. The arrested fragments F of bone and other hard tissue are continuously guided toward a waste discharge zone where they are collected.

Figures 2, 2A, 2B, 3, 9:
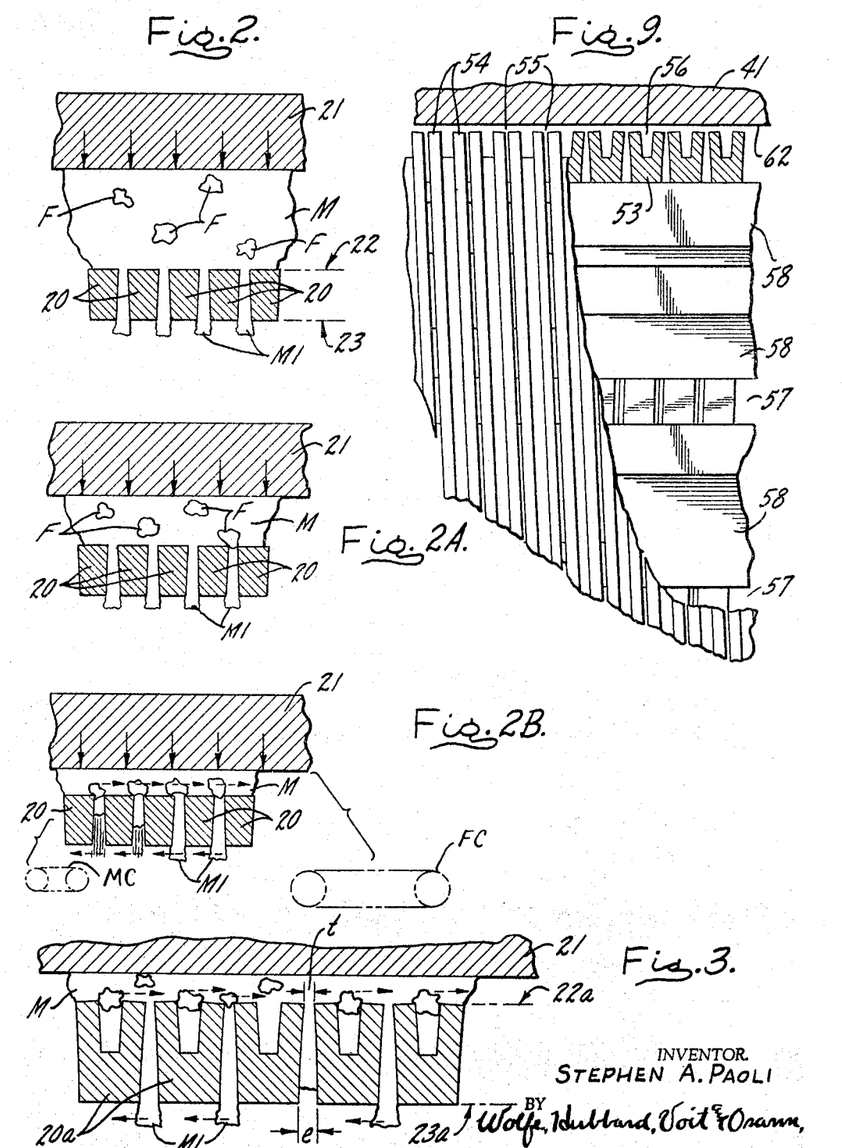
FIGS. 2, 2A and 2B are enlarged diagrammatic sequential views illustrating the practice of the method of the invention in greater detail.
FIG. 3 is an enlarged diagrammatic view of illustrating another mode of practicing the method of the invention.
FIG. 9 is an enlarged fragmentary view, partially in plan and partially in horizontal section, detailing the configuration of the outer peripheral portion of the rotor and certain adjacent structure.

In order to accomplish such distinguishing action, there are provided in the present instance a plurality of relatively thin cutting elements 20 in closely spaced apart relation with each other, together with means 21 for pressing the meat M against the cutting elements with sufficient pressure to force it therebetween. The surfaces of the cutting elements facing the pressing means define a common pressure face 22 which may assume a variety of specific contours. By the same token, the surfaces of the cutting elements remote from the pressing means define a common discharge face 23 which may also assume a variety of specific contours. The spaces between the cutting elements are smaller than the average diameter of the smallest fragments to be removed.

The cutting elements and pressing means are movable relative to each other and in this case are disposed with the common pressure face 22 of the cutting elements and the face of the pressing means 21 opposing each other in diverging relation from a region of close spacing therebetween. The spacing in this region may, for example, be comparable to the space between adjacent ones of the cutting elements. The coarse agglomeration of meat and fragments M, F, is passed into the widening space between these diverging surfaces and their relative movement carries it toward the region of closest proximity between these surfaces. This spreads the agglomeration into a moving web of decreasing thickness terminating at the region of closest proximity between the cutting elements and the pressing means. As the web is forced toward this region, the meat M is forced between the cutting elements and pressed and cut into much finer pieces than existed previously. The fragments F of bone, gristle or sinew are distinguished and collected on the pressure face side of the cutting elements. The pressed and cut boneless comminuted meat $M_1$ is collected on the opposite or discharge face side of the cutting elements. As an incident to such relative movement of the cutting elements and pressing means, the collected meat $M_1$ is positively moved or guided away from the cutting elements 20 and the fragments F are also positively moved or guided away from the cutting elements. In the present instance, the fragments F are moved in one direction (indicated by the arrows in FIG. 2B) and collected on the conveyor or receiving means FC, while the boneless comminuted meat $M_1$ is moved in the opposite direction (also indicated by the arrows in FIG. 2B) and collected on the conveyor or receiving means MC.

In the practice of the method of the invention, provision is made to facilitate the flow of fragment-free meat $M_1$ between the cutting elements 20. This is accomplished by so arranging the cutting elements 20 that the respective spaces therebetween will be constricted adjacent the pressure face 22 and progressively relieved toward the discharge face 23. This defines in each space between two neighboring cutting elements a throat $t$ of minimal cross-section adjacent the pressure face 22 and an exit $e$ of somewhat larger cross-section adjacent the discharge face 23. Once the meat $M_1$ has been forced through the throat $t$, it tends to flow readily between the cutting elements and through the exit $e$ without clogging.

The method of the invention may also be practiced using modified cutting elements 20a as shown in FIG. 3. The elements 20a, like the elements 20, are disposed in closely spaced apart relation with each other and are adapted to coact with the pressing means 21 in the manner described above. Each of the spaces between the elements 20a is constricted to define a throat $t$ adjacent pressure face 22a and is relieved to define a larger exit $e$ adjacent the discharge face 23a. In this instance, however, each cutting element has a blind groove 24 formed in its pressure surface. The groove 24 is somewhat wider than the throat $t$ between adjacent cutting elements and tapers outwardly so as to have its maximum width at the pressure face. By the use of such elements, additional cutting action is brought to bear on the mass of meat M. In addition, the grooves 24 introduce added areas for engaging and ejecting fragments F.

Referring more specifically to FIGURES 1 and 4 to 11, inclusive, an illustrative machine 25 of particular utility in the practice of the method of the invention is there exemplified. The machine 25 is adapted to receive an agglomeration of ground or comminuted meat M containing entrained fragments F of bone, cartilage, sinew or the like and to separate such fragments from the meat. The machine 25 comprises a base 26 of channel members or other suitable structural elements adapted for mounting on the floor or any other appropriate support. The base 26 has a power unit 28 mounted thereon and which, in turn, supports a separator unit 29 projecting in cantilever fashion therefrom. The separator unit 29 is driven by the power unit 28 under the control of start-stop switch 30.

Figure 4:
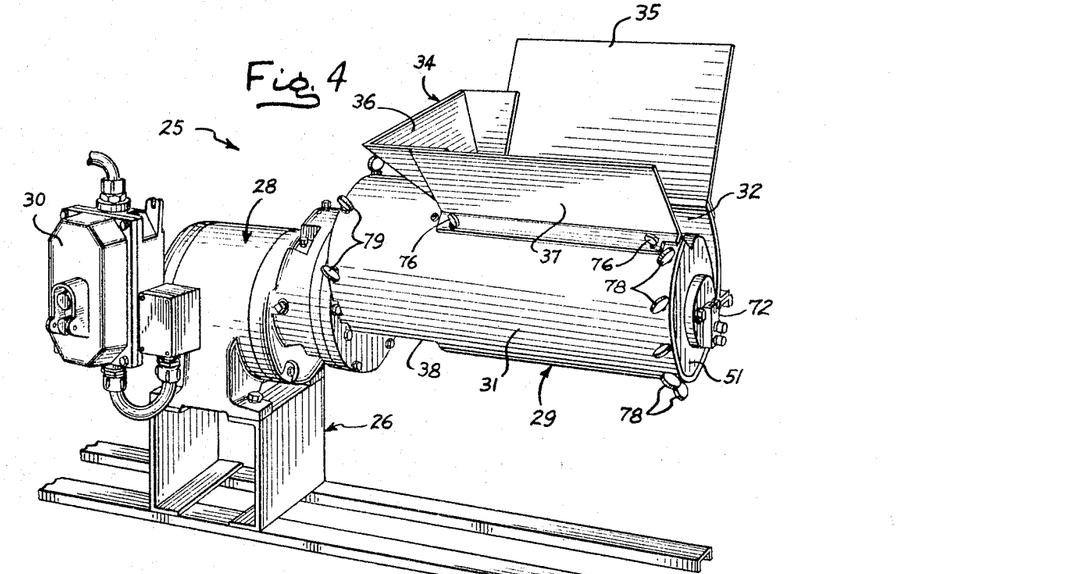
FIG. 4 is a perspective view of an illustrative bone fragment separating machine through which the method of the present invention may be practiced.
Figure 5:
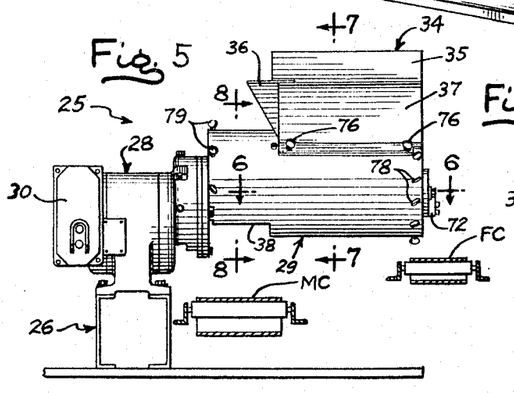
FIGS. 5 and 5A are, respectively, side and end elevational views of the illustrative machine shown in FIG. 4.

The separator unit 29 (FIGS. 4, 6, 7 and 8) comprises a casing 31, which in this instance happens to be of generally cylindrical form. The casing 31 has a relatively long intake aperture 32 in its top portion surmounted by a hopper 34 with downwardly converging sides 35, 36 and 37. The casing 31 has a somewhat shorter meat discharge aperture 38 in its lower portion adjacent the power unit 28. After passing through the work zone of the separator unit 29, the usable meat, less fragments, is discharged to a collecting means such as the conveyor MC while the fragments, with a negligible proportion of usable meat, are discharged, via the open outer end of the casing 31, to another collecting means such as the conveyor FC (FIG. 5).

Figure 6:
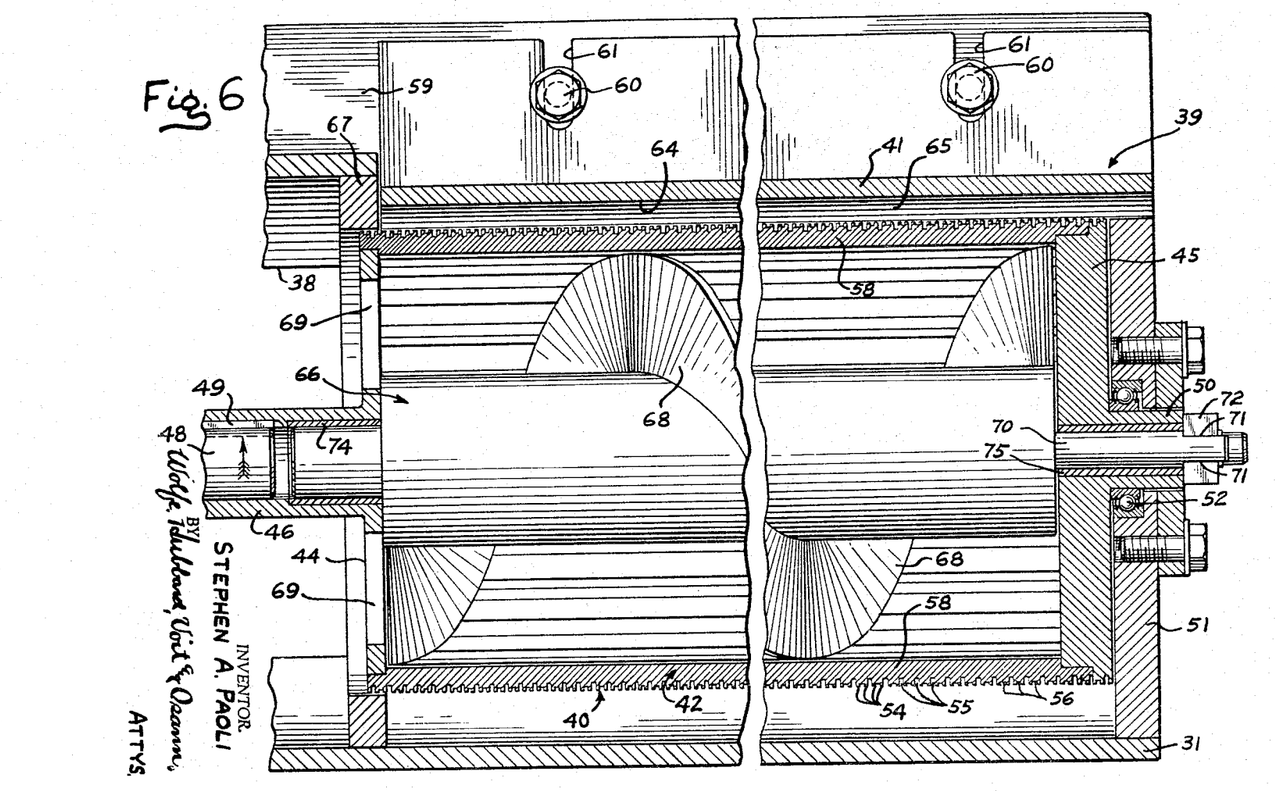
FIG. 6 is an enlarged fragmentary view, partly in plan and partly in section, taken in the plane of the line 6—6 in FIG. 5.
Figure 7:
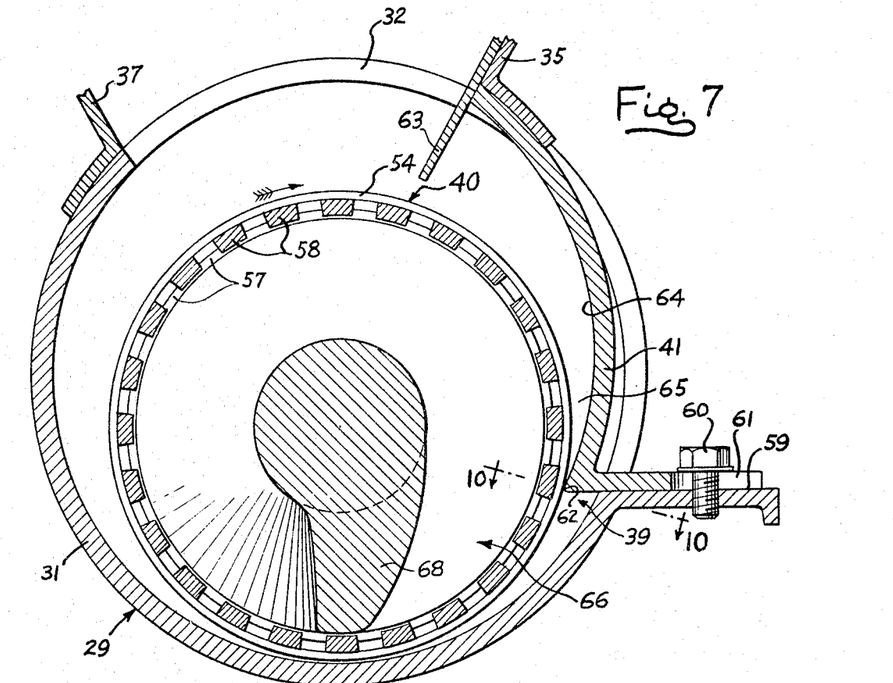
FIGS. 7 and 8 are enlarged fragmentary vertical sectional views taken transversely through the machine in the planes of the lines 7—7 and 8—8, of FIG. 5, respectively.

For the purpose of automatically and continuously effecting separation of the bone and other unwanted fragments from the usable comminuted or ground meat without damaging the meat in any way, the separator unit 29 is provided at its work zone with a remarkably simple, yet effective, separator mechanism 39 (FIGS. 6 and 7). Such mechanism comprises a power driven rotor 40 having a specially defined outer peripheral surface and a specially defined pressure bar or plate 41 which coacts with the rotor to permit the passage of usable meat but not the somewhat harder fragments of bone, gristle or sinew. In the course of its operation, the mechanism 39 is adapted to effect the progressive discharge of usable meat free of such fragments, as well as the progressive discharge of the separated fragments. For sanitation, all of these parts are preferably made of stainless steel or other corrosion resistant material and capable of being quickly disassembled and reassembled.

In the present instance, the rotor 40 (FIGS. 6, 7 and 8) is formed as a hollow cylindrical body 42 supported at its ends by a pair of concentric end plates 44, 45. The plate 44 is rigidly fixed to one end of the body 42 as by welds (not shown) and includes a hub 46. The latter fits telescopically on drive shaft 48 of the power unit 28 and is keyed as at 49 or otherwise drivingly connected to the shaft 48. The end plate 45 is formed with a stepped outer periphery and freely interfits with the opposite or outboard end of the body 42. The plate 45 is also formed with a hub 50 journaled in casing end wall 51 as by means of a combined line and thrust bearing 52.

Provision is made in the separator mechanism 39 for selectively passing pieces of comminuted meat M while holding back and separately discharging fragments F of bone, cartilage, gristle or sinew previously entrained therein. To this end, the rotor is formed with a plurality of relatively thin, closely spaced cutting elements 53 helically disposed in its outer periphery. The spaces between such cutting elements communicate with the interior of the rotor and have a width on the order of 0.008–0.012 inch, which is somewhat smaller than the average diameter of the smallest fragments to be removed. The pressure bar 41 is formed with a cooperating pressure surface tapering progressively closer to the rotor periphery but terminating at a clearance distance therewith also somewhat smaller than the average diameter of the smallest fragments to be removed. Such clearance distance may, for example, be on the order of 0.004–0.005 inch.

Referring more specifically to FIGS. 4 to 11, inclusive, it will be noted that the rotor body 42 comprises cutting elements 53 of generally helical form. In order to intensify the cutting action brought to bear on the meat M and to introduce additional capacity for engaging and ejecting the undesired entrained fragments F, the outer peripheral faces of the cutting elements 53 are in this instance formed with closely spaced twin ribs 54. This defines between each adjacent pair of cutting elements 53 an open or through groove 55 communicating with the interior of the rotor, and a relatively shallow blind groove 56 between the twin ribs 54 of each cutting element. The cutting elements 53 in this case are arranged in multiple helices, each having a pitch of two turns per inch, with six individual elements 53 starting at equal angular intervals about the circumference at one end of the rotor. This results in twenty-four ribs 54 per inch of rotor length on the outer periphery of the rotor body.

Each of the open grooves 55 is constricted adjacent the pressure face defined by the outer peripheral surfaces of the ribs 54 and relieved adjacent the discharge face defined by the inner peripheral surfaces of the cutting elements 53. This creates in each open groove 55 a throat $t$ adjacent the pressure face and an exit $e$ of somewhat larger cross-section adjacent the discharge face, facilitating ready flow of meat through the groove 55. In this instance, the throat $t$ may be 0.008–0.012 inch in width while the exit $e$ may be 0.016–0.018 inch in width. Each blind groove 56 is substantially wider than the throat of each open groove 55, adapting it more readily to pick up and eject the fragments F. Each blind groove 56 happens to be about 0.050 inch deep and flares outwardly from a minimum width of 0.016–0.018 inch at the bottom to a maximum width of 0.020–0.024 inch at the pressure face, minimizing any tendency to clog.

The interior of the rotor body 42 is formed with a plurality of longitudinally extending slots 57, in this case twenty-four in number, each of a depth extending to the root diameter of the cutting elements 53 and connecting with the open grooves 55, as shown in FIGS. 7, 8, 10 and 11. This defines a corresponding plurality of longitudinally extending lands 58 in the body to preserve its mechanical strength.

Turning now to the pressure bar or plate 41 (FIGS. 5, 6 and 7), it will be noted that the same is a relatively heavy member, preferably of stainless steel or other corrosion resistant material, and in this case of modified L-shaped cross-section. The bar 41 is mounted on platform 59 of the casing 31 and is securely held in a predetermined position as by means of clamping screws 60, being formed with adjusting slots 61 which receive the screws 60 and permit adjustment of the bar 41 toward or away from the outer periphery of the rotor 40. The bar 41 is arranged with its lower left corner edge 62 (as viewed in FIGS. 3 and 5) closest to the peripheral surface of the rotor. The position of the pressure bar 41 circumferentially of the rotor may be varied. For best results, however, the circumferential position of the bar should be such that its edge 62 is in the general vicinity of a horizontal plane through the rotor axis.

Extending upwardly toward the intake aperture 32, and in a direction substantially secantial to the rotor at the edge 62, is an inclined concave face 64 on the bar 41. The face 64 defines with the outer periphery of the rotor a funnel-like pocket 65. Pieces of meat M fed onto the ribbed surface of the rotor are accelerated by the latter and, upon entry into the pocket 65, have somewhat greater frictional engagement with the rotor surface than with the pressure bar face 64. This, along with the angularity or taper of the pressure bar face 64, compresses the meat against the cutting ribs 54 of the rotor, cutting and forcing it therebetween into the interior of the rotor body 42 whence it is directed to a collecting means. This meat, of finely divided pieces, is free of objectionable fragments of bone, gristle or the like and represents a high quality usable product.

The pocket 65 also provides a place at its inner end where the fragments of bone, gristle or sinew accumulate while being gradually driven longitudinally of the rotor and the pressure bar 41. Such longitudinal movement is accomplished by reason of the pitch of the helical ribs on the rotor and its direction is determined by the direction of the pitch of the ribs and the direction of rotation of the rotor. In the illustrative form of the machine described thus far, the ribs have a right-hand pitch and the rotor 40 turns in a clockwise direction, as viewed from the end remote from the motor in FIGS. 1, 5 and 7. This result sin moving the bone and gristle fragments F toward the right-hand end of the pressure bar 41, as viewed in FIGS. 1, 6 and 9, discharging them via the open outer end of the pocket 65 onto a receiving means such as the conveyor FC (FIG. 5). Annular baffle 67 (FIG. 6), fixed to the casing 31 adjacent the meat discharge aperture 38, is disposed in closely spaced surrounding relation with the inner or left-hand end of the rotor 40 and prevents by-passing of the pocket 65 by incoming fragment-bearing meat.

The machine may include means to control the rate at which meat is fed into the pocket 65 and to facilitate engagement of the meat with the rotor cutting ribs 54. This may be accomplished by the use of a regulator blade 63 (FIGS. 5A and 7) mounted at or adjacent the trailing side of the intake aperture 32. The blade 63 may be adjustably attached to hopper panel 35 as by means of screws (not shown) so as to permit the blade to be shifted toward or from the rotor and selectively positioned for most favorable operation.

Figure 8:
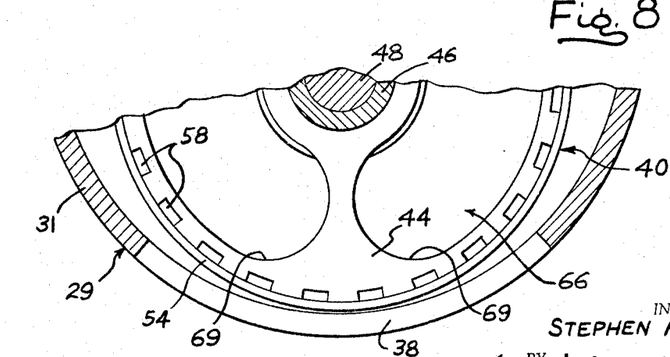
Figure 10:
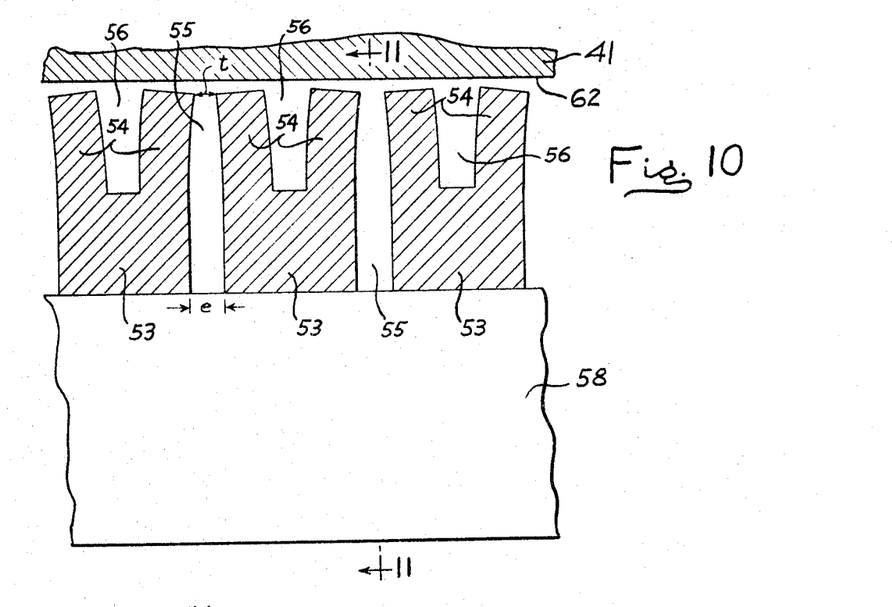
FIG. 10 is a further enlarged fragmentary longitudinal sectional view through a portion of the machine rotor, taken in the plane of the line 10—10 in FIG. 7.
Figure 11:
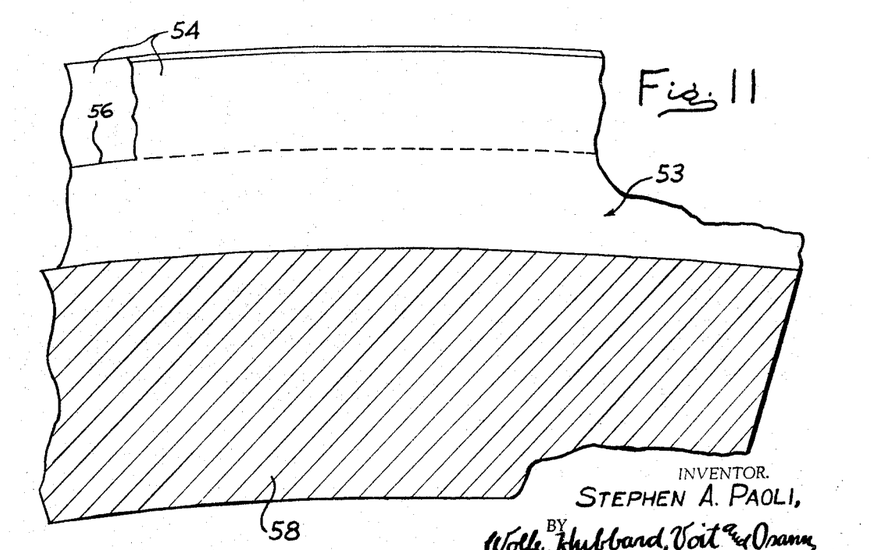
FIG. 11 is an enlarged fragmentary transverse sectional view through a portion of the machine rotor, taken in the plane of the line 11—11 in FIG. 10.

Provision is made for collecting and discharging the fragment-free usable meat product from the interior of the rotor body continuously and as an incident to rotation of the rotor. This is accomplished in the present instance by the use of an auger 66 (FIGS. 6 and 7) having a helical flight 68 fitted in relatively closely spaced relation with the inner faces of the lands 58. The auger is housed within the interior of the rotor body 42 and secured against rotation. Thus, as the rotor 40 rotates, relative movement will occur between the inner wall of the rotor body 42 and the auger flight 68 tending to scrape the meat from the inside of the rotor body and move it in a helical path following the flight 68. As will be appreciated, the helical direction of the flight 68 determines which way the product will be moved, and, in this instance, it is adapted to direct the product to the left as viewed in FIGS. 4 and 6. To facilitate discharge of the product from the auger, the end plate 44 has a plurality of large sector shaped apertures 69 (FIG. 8). The product passes through these apertures, out of the rotor body 42, and thence out the meat discharge aperture 38 in the machine casing (FIGS. 4, 5 and 8). From the aperture 38, the meat drops to an appropriate receiving means such as the discharge conveyor 24.

The auger 66 is held in place by means of auger shaft 70 to which it is rigidly fixed. The right-hand end portion of the shaft 70 (as viewed in FIG. 6) is formed with a pair of opposed flats 71 and slidably fits into an opening of corresponding shape in a fixed bracket 72. The opposite end of the shaft 70, of larger diameter, simply telescopes into the hub 46 of inner end plate 44. Bearings 74 and 75, recessed into respective ones of the end supports 44, 45, journal the rotor 40 with respect to the auger 66 and auger shaft 70.

Figure 5A:
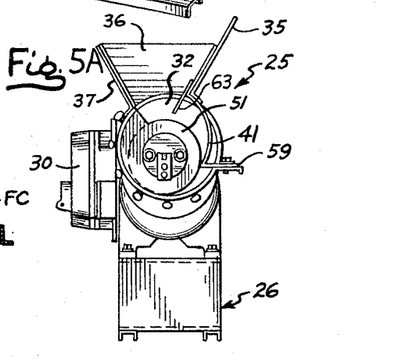

The machine 25 is designed so that its working parts in active contact with the meat may be readily dismantled for cleaning. It will, accordingly, be noted that one or more of the hopper panels 37 may be removed by loosening detachable fasteners such as thumb screws 76 (FIGS. 4, 5 and 5A). Outer end wall 51 of the casing may be removed by loosening additional detachment fasteners such as thumb screws 78. This provides access to the rotor 40 and auger 66, permitting these members to be removed bodily by sliding them outwardly so as to disengage the hub 46 from the drive shaft 48. The casing 31 itself may then be disconnected from the power unit 28 by loosening still other fasteners such as thumb screws 79.

For optimum application of the machine to the widely varying operating conditions found in the poultry, meat, fish, and food processing industry, a number of factors must be considered and correlated. These may be grouped broadly under two categories, the physical characteristics of the machine and the composition of the mass of comminuted meat and fragments of bone, gristle or sinew to be processed by the machine. Under physical characteristics, factors such as rotor length and diameter, rotor speed, drive power, configuration and spacing of the cutting element ribs, and pressure bar placement, both circumferential and radial, all have a bearing on the capacity of the machine in pounds of material processed per hour. These same factors also affect the efficiency of the machine in terms of percentage ratio of pounds of usable meat obtained to total pounds of material processed. With regard to the second category, it will be appreciated that a mass of comminuted meat with a high ratio of fragment content to usable meat will require different processing time from a mass with a lower ratio of fragments to usable meat. The relative hardness of the muscular structure, the fat content, and the moisture content of the meat are further factors which affect the processing time.

Turning now to FIGS. 12 through 17A, these are photographs of two sets of material samples taken at various stages in the performance of the method of the invention. One set of samples, shown in FIGS. 12 through 14A, was made using dressed carcass of whole fowl, specifically chicken, as the raw material. The other set of samples, shown in FIGS. 15 through 17a, was made using gutted but otherwise whole fish as the raw material.

Figure 12:
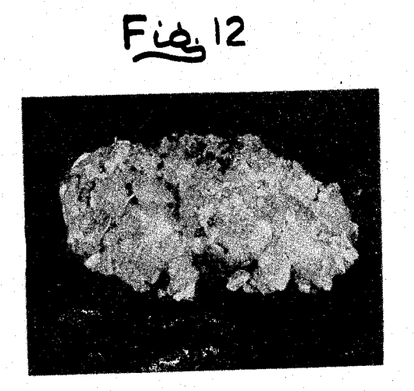
FIGS. 12, 13 and 14 are a series of photographs to actual size of one set of material samples taken sequentially during performance of method of FIG. 1.

The photograph in FIG. 12 depicts a sample of the coarse agglomeration of fragmented soft and hard tissues taken at the output of the reduction stage R (FIG. 1). In this instance, reduction was effected by an auger type grinder with an orifice plate have ⅜" opening therein. The texture of the fragmented meat, bone, cartilage, fat and skin in this coarse agglomeration is readily apparent in FIG. 12, as well as in FIG. 12A which depicts a portion of the FIG. 12 sample enlarged to twice actual size.

Figure 12A:
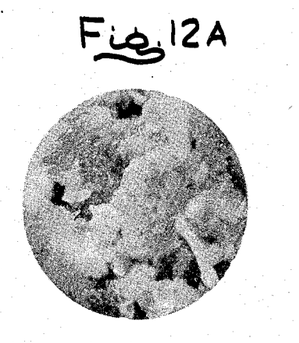
FIGS. 12A, 13A and 14A are a series of photographs showing portions of the samples of FIGS. 12, 13 and 14 but enlarged to twice actual size.
Figure 13:
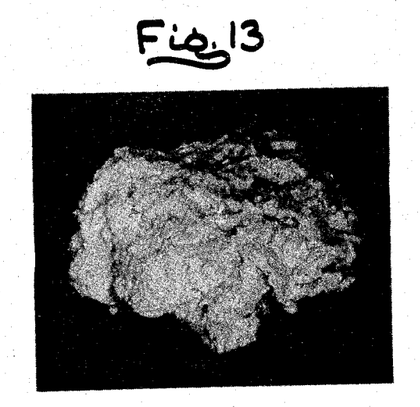
Figure 13A:
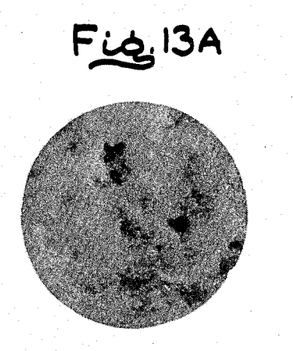

FIG. 13 is a photograph of a sample of boneless comminuted chicken meat produced from the coarse agglomeration shown in FIGS. 12 and 12A. The sample, taken at the output of the separating stage S (FIG. 1), contained substantially no fragments of bone or other hard tissue readily perceptible to the touch when held between the fingers. FIG. 13A is a photograph of a portion of this sample enlarged to twice actual size. The boneless comminuted meat, in the condition shown, may be packaged for direct use or used to produce a variety of processed foods.

Figure 14:
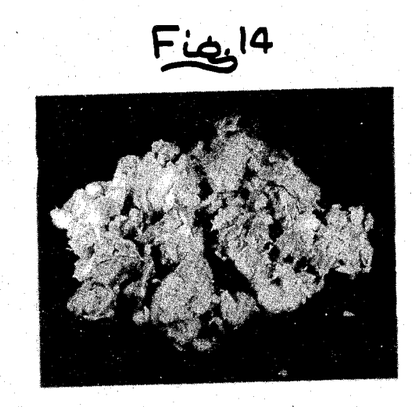
Figure 14A:
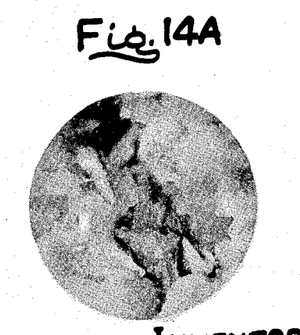

FIG. 14 is a photograph of the bone and hard tissue fragments F or waste material removed from the agglomeration shown in FIGS. 12 and 12A. The sample was taken at the waste discharge end of the separating stage S. FIG. 14A is a photograph of a portion of this sample enlarged to twice actual size. This material, in the condition shown, may be converted into by-products such as dog food.

Figure 15:
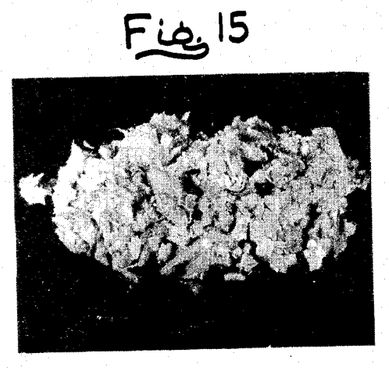
FIGS. 15, 16 and 17 are a series of photographs to actual size of another set of material samples taken sequentially during the performance of the method of FIG. 1.

The photograph in FIG. 15 depicts a sample of the coarse agglomeration of fragmented soft and hard tissues taken at the output of the reduction stage with gutted but otherwise whole fish used as the raw material. As in the case of the fowl mentioned above, reduction was effected by means of an auger type grinder with an orifice plate having ⅜" openings therein. The texture of the fragmented meat, bone, skin, fins and scales in this agglomeration is apparent in FIG. 15, and particularly in FIG. 15A which shows a portion of the FIG. 15 sample enlarged to twice actual size.

Figure 15A:
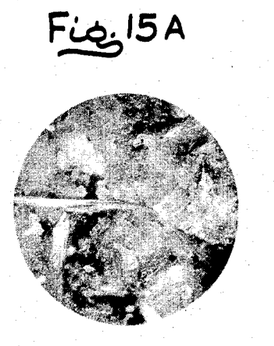
FIGS. 15A, 16A and 17A are a series of photographs showing portions of the samples of FIGS. 15, 16 and 17 but enlarged to twice actual size.
Figure 16:
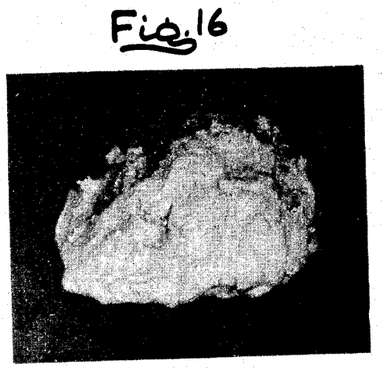
Figure 16A:
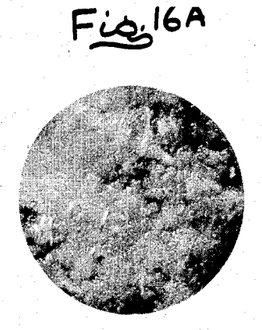

FIG. 16 is a photograph of a sample of boneless comminuted fish meat produced from the coarse agglomeration shown in FIGS. 15 and 15A. This sample was taken at the output of the separating stage S and contained substantially no fragments of bone or other hard tissue readily perceptible to the touch when held between the fingers. FIG. 16A is a photograph of a portion of the FIG. 16 sample enlarged to twice actual size. The boneless fish meat, in the condition shown, may be packaged for direct use or used to produce a variety of processed foods.

Figure 17:
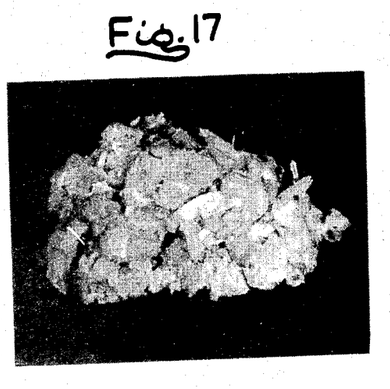
Figure 17A:
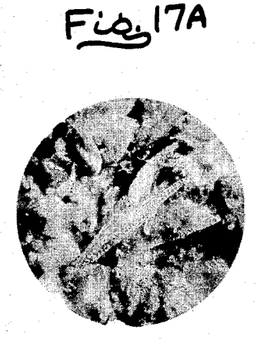

FIGS. 17 and 17A depict a sample of the bone and hard tissue fragments F or waste material removed from the agglomeration shown in FIGS. 15 and 15A. FIG. 17A is a photograph of a portion of this sample enlarged to twice actual size. This material, in the condition shown, may be converted into by-products.

It will be appreciated that the invention described herein may be utilized to great advantage, particularly in the poultry processing industry. Automated boning of a whole fowl, such as a cock or fryer hen, never accomplished heretofore, may now be carried out with speed and efficiency through application of the present invention, with a high quality usable meat yield of about 60% by weight. Turkey wings and drumsticks, heretofore difficult if not impossible to bone satisfactorily, may be processed in accordance with the invention, emerging as high quality usable meat having several times its previous value. Necks, backs, and other parts of chicken and turkey never before boned economically, may now be similarly boned and converted to higher value usable meat in a fully automated process. These results are of real economic significance to the poultry industry.

It will be further appreciated that the invention described herein may be utilized advantageously in the fish processing industry. Automated boning of a gutted but otherwise whole fish carcass may be accomplished economically and efficiently at high production rates through application of the invention, with a usable meat yield of about 75% by weight. Automated processing of skeletal fish may also be accomplished in a similar manner with a somewhat lower yield, converting what would otherwise be by-product material into a higher value usable food product. As a result of the invention, end products such as fish meal may now be produced economically in large volume in a fully automated process meeting the most rigid sanitation standards of governmental agencies in the United States or abroad. The availability of a high protein product such as fish meal in large volume, at low cost, and of high purity, is a matter of primary importance.

I claim as my invention:

1. The method of producing boneless comminuted meat comprising the steps of reducing a dressed animal carcass or portion thereof to a coarse agglomeration of fragmented soft and hard tissues including meat, bone and cartilage; directing the agglomeration between a pressing means and a plurality of ribbed comminuting elements, the latter being relatively closely spaced with respect to each other and moving in an endless path; effecting continuous mechanical separation of the agglomeration by forcing boneless comminuted meat between said comminuting elements while the latter arrest and expel perceptible fragments of bone, cartilage and the like; collecting the separated boneless comminuted meat; and collecting the separated fragments.

2. The method set forth in claim 1 wherein boneless comminuted meat is produced by reducing a dressed whole fowl carcass or portions thereof.

3. The method of producing boneless comminuted fish meat comprising the steps of reducing a gutted whole fish carcass or portion thereof to a coarse agglomeration of fragmented soft and hard tissues including fish meat, bone, cartilage, skin, scales and fins; directing the agglomeration between a pressing means and a plurality of ribbed comminuting elements, the latter being relatively closely spaced with respect to each other and moving in an endless path; effecting continuous mechanical separation of the agglomeration boneless comminuted fish meat between said comminuting elements while the latter arrest and expel perceptible fragments of bone, cartilage, scales and fins; collecting the separated boneless comminuted fish meat; and collecting the separated fragments.

4. The method set forth in claim 3 wherein boneless comminuted fish meat is produced by reduction of a gutted whole fish carcass or portion thereof such as gutted skeletal fish.

5. The method of producing boneless comminuted meat comprising the steps of reducing a dressed animal carcass or portion thereof to a coarse agglomeration of fragmented soft and hard tissues including meat, bone and cartilage; spreading the agglomeration into a moving web of decreasing thickness; pressing the agglomeration against a plurality of relatively closely spaced movable comminuting elements so as to pass comminuted meat in boneless state therebetween and to arrest perceptible fragments of bone, cartilage and other hard tissues; guiding the boneless comminuted meat toward a meat discharge zone and collecting said meat; and guiding the arrested fragments toward a discharge zone and collecting said fragments.

6. The method of producing boneless comminuted meat comprising the steps of reducing a dressed animal carcass or portion thereof to a coarse agglomeration of fragmented soft and hard tissues including meat, bone and cartilage; directing the agglomeration between a pressing member and a plurality of cutting elements, the latter being disposed in a relatively closely spaced apart relation with each other; effecting continuous mechanical separation of the agglomeration into boneless comminuted meat and into perceptible fragments of bone, cartilage and the like by relative movement between said pressing member and said cutting elements whereby the agglomeration is pressed against one side of said cutting elements with sufficient pressure to force comminuted meat therebetween and to the other side thereof; guiding the fragments of bone, cartilage and the like on said one side of said cutting elements away from the latter as an incident to said relative movement and collecting said fragments; and guiding the boneless comminuted meat on the other side of said cutting elements away from the latter as an incident to said relative movement and collecting said meat.

7. The method of producing boneless comminuted meat as set forth in claim 6 and wherein the boneless comminuted meat and the fragments of bone, cartilage and the like are moved away from said cutting elements in opposite directions as an incident to said relative movement.

8. The method of producing boneless comminuted raw meat comprising the steps of reducing a dressed animal carcass or portion thereof to a coarse agglomeration of fragmented soft and hard tissues including meat, bone and cartilage; effecting continuous mechanical separation of the agglomeration into boneless comminuted meat and into perceptible fragments of bone and other hard tissues by pressing the agglomeration against one side of a plurality of relatively thin cutting elements with sufficient pressure to force comminuted meat therebetween said cutting elements being disposed in relatively closely spaced relation defining spaces therebetween constricted in width adjacent said one side thereof and relieved to a substantially greater width adjacent said other side thereof; arresting fragments of bone and other hard tissues on said one side of said cutting elements and guiding said fragments away from said cutting elements; and guiding the boneless comminuted meat on the other side of said cutting elements away from the latter.

9. The method of producing boneless comminuted meat comprising the steps of reducing a dressed animal carcass or portion thereof to a coarse agglomeration of fragmented soft and hard tissues including meat, bone, and cartilage; directing the agglomeration between a pressing element and a plurality of relatively closely spaced comminuting elements opposed thereto; forcing meat fragments between said comminuting elements to the opposite side thereof while arresting bone and cartilage fragments by relative movement between said pressing element and said comminuting elements; and forcing the arrested bone and cartilage fragments away from said comminuting elements by said relative movement.

10. The method of producing boneless comminuted meat comprising the steps of reducing a dressed animal carcass or portion thereof to a coarse agglomeration of fragmented soft and hard tissues including meat, bone, and cartilage; gradually pressing the agglomeration against and between a plurality of relatively closely spaced rotatable comminuting elements whereby meat fragments will pass between said elements to one side thereof while bone and cartilage fragments will remain on the opposite side of said elements, the rotatable comminuting elements effecting movement of the passed meat fragments in one direction and movement of the bone and cartilage fragments in another direction.

11. The method of producing boneless comminuted meat comprising the steps of reducing a dressed animal carcass or portion thereof to a coarse agglomeration of fragmented soft and hard tissues including meat, bone, and cartilage; directing said agglomeration between a pressing means and a plurality of relatively closely spaced ribbed comminuting elements opposed thereto; forcing by relative movement between said pressing means and said comminuting elements meat fragments between said comminuting elements to the opposite side thereof in a boneless comminuted state while arresting bone and cartilage fragments; forcing said arrested bone and cartilage fragments away from said comminuting elements by said relative movement; and forcing said boneless comminuted meat away from said comminuting elements by said relative movement.

12. The method of producing boneless comminuted meat comprising the steps of reducing a dressed animal carcass or portion thereof to a coarse agglomeration of fragmented soft hard tissues including meat, bone, and cartilage; gradually pressing the agglomeration against and between a plurality of relatively closely spaced movabe comminuting elements skewed with respect to their direction of motion whereby meat fragments will pass between said elements to one side thereof while bone and cartilage fragments will remain on the opposite side of said elements, the movable comminuting elements effecting movement of the passed meat fragments in one direction and movement of the bone and cartilage fragments in another direction.

References Cited by the Examiner

UNITED STATES PATENTS

| | | | |
|---|---|---|---|
| 833,715 | 10/1906 | Graham | 209—91 |
| 1,151,674 | 8/1915 | Durrant | 146—240 |
| 1,244,774 | 10/1917 | Pointe | 146—174 X |
| 1,446,091 | 2/1923 | Hurt | 146—176 |
| 1,480,984 | 1/1924 | Bell | 146—222 |
| 1,752,047 | 3/1930 | Wirt | 146—176 |
| 2,600,867 | 6/1952 | Gerritsen. | |
| 2,858,223 | 10/1958 | Harris. | |
| 3,024,823 | 3/1962 | Hyde et al. | 146—174 |

FOREIGN PATENTS

| | | |
|---|---|---|
| 61,721 | 12/1943 | Denmark. |
| 1,066,902 | 10/1959 | Germany. |

ROBERT C. RIORDON, *Primary Examiner.*

WILLIE G. ABERCROMBIE, *Examiner.*